Figure 1:
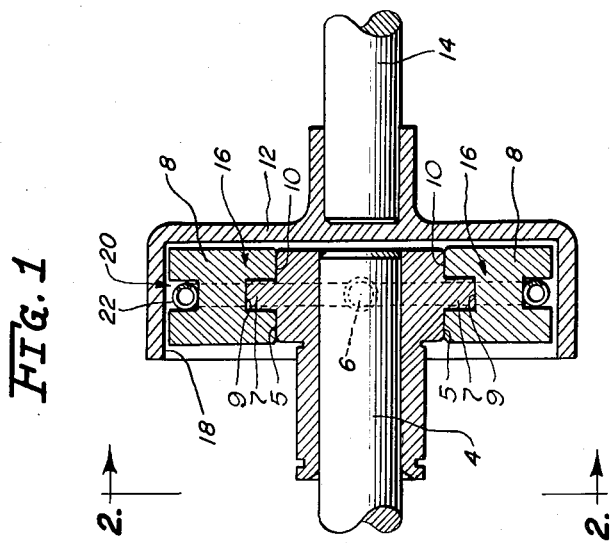

June 19, 1962  H. C. DAHLMAN ET AL  3,039,577

CLUTCH ASSEMBLY

Filed June 13, 1960

INVENTORS
Herbert C. Dahlman
Roy L. Rozelle
Neal T. Amos

BY George R. Woodruff

ATTORNEY

大专利 Office

3,039,577
CLUTCH ASSEMBLY

Herbert C. Dahlman and Roy L. Rozelle, Beloit, and Neal T. Amos, Wisconsin Dells, Wis., assignors to Fairbanks, Morse & Co., Chicago, Ill., a corporation of Illinois
Filed June 13, 1960, Ser. No. 35,681
1 Claim. (Cl. 192—105)

This invention relates to clutches and is particularly directed to novel clutch assemblies wherein the clutch shoes are retained in position solely by means of a continuous circumferential spring.

In the construction of clutches, it is conventional to provide a generally cylindrical drum or housing which is connected to a member which is to be driven when the clutch is engaged. Cooperating with the drum are one or more shoe members which are driven by a suitable power source and which may be caused to frictionally engage the drum member to transmit driving force from the power source to the driven member. The shoes may be energized mechanically, electrically, centrifugally or by other suitable means to cause them to engage the drum when desired. Moreover, the shoes are frequently formed in the shape of arcuate segments so as to provide maximum surface for frictionally engaging the drum.

Heretofore, it has been the practice to provide a generally square head for attachment to the drive shaft and to secure the shoes to this head by pivot means adjacent one end of each of the shoes. However, when this is done, the shoes do not engage the drum evenly throughout their surfaces. Consequently, they are subjected to uneven wear and require more frequent replacement. In the alternative, it has been proposed to provide a plurality of guide rods projecting from the head and receivable within recesses formed in the clutch shoes. In addition, the shoes are formed with apertured projections and bolts are provided which carry coil springs and which project through the apertured projection on one shoe into threaded engagement with the other shoe to resiliently retain the shoes. However, this construction is relatively complicated and is expensive to produce and still does not provide even load distribution.

These disadvantages of prior art clutches are overcome with the present invention and a novel clutch construction is provided which is simple to construct and inexpensive to produce and yet assures uniform engagement of the entire surface of the shoe with the drum.

The advantages of the present invention are preferably attained by providing a generally rectangular head for attachment to the drive shaft together with a pair of shoes which are formed in the shape of arcuate segments having a flat side which is slightly longer than the longest side of the head. In addition, the arcuate sides of the shoes are formed to conform to the inner surface of the drum and are provided with a centrally located recess extending the entire length thereof. To secure the shoes to the head, a single, continuous coil spring is provided which is seated in the recesses of the shoes. With this arrangement, the clutch shoes are reduced to basic forms which may be produced easily and inexpensively and which require a minimum of machining.

Accordingly, it is an object of the present invention to provide a novel clutch assembly.

Another object of the present invention is to provide a novel clutch assembly which permits uniform frictional engagement between the shoes and drum throughout substantially the entire surface thereof.

A further object of the present invention is to provide a novel clutch assembly which requires a minimum number of parts.

An additional object of the present invention is to provide a novel clutch assembly which may be produced easily and inexpensively.

A specific object of the present invention is to provide a novel clutch assembly comprising a generally rectangular head for attachment to the drive shaft, a generally cylindrical drum, a pair of shoes formed in the shape of arcuate segments having a flat side slightly longer than the longest side of said head and having the arcuate sides formed to conform to the inner surface of said drum and provided with a centrally located recess extending the entire length thereof, and a single, continuous coil spring seated in said recess to normally secure said shoes in engagement with said head.

These and other objects and features of the present invention will be apparent from the following detailed description wherein reference is made to the figures of the accompanying drawing.

Figure 2:
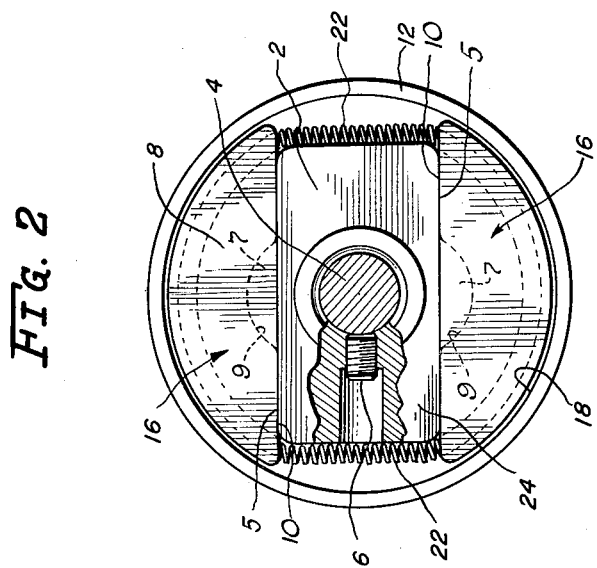

In the drawing:

FIG. 1 is a front view, partly in section, of a typical clutch assembly embodying the present invention; and FIG. 2 is a side view, partly in section, of the clutch assembly of FIG. 1.

In that form of the present invention chosen for illustration in the drawing, FIG. 1 shows a clutch assembly comprising a generally rectangular head 2 secured to a drive shaft 4 by a set screw 6, or other suitable means. The drive shaft 4 is adapted to be rotated by any suitable means, not shown, as is well known in the art. A pair of clutch shoes 8 are provided and are disposed on opposite sides of the head 2. Each of the shoes 8 is formed in the shape of an arcuate section and has a flat side 10 engageable with the longest sides 5 of the head 2 and projecting slightly beyond both ends of the head 2. The sides 5 of the head 2 are preferably provided with centrally located arcuate tongues 7 which project outwardly from the sides 5 of the head 2 and engage arcuate recesses 9 formed in the flat sides 10 of the shoes 8 to maintain the shoes 8 centered with respect to the head 2.

In addition, as best seen in FIG. 2, a generally cylindrical drum 12 is provided and is attached, by any suitable means, to a driven member, such as shaft 14. The arcuate sides 16 of the clutch shoes 8 are formed to mate with the inner surface 18 of the drum 12 and are provided with a centrally located recess 20 extending the entire length thereof. A single, continuous coil spring 22 is seated in the recesses 20 of both clutch shoes 8 and serves to normally retain the clutch shoes 8 in engagement with the driving head 2.

It will be seen that, with this arrangement, a clutch assembly is provided which comprises only five parts; a driving head, two shoes, a spring and a drum. Moreover, the forms of the head and shoes are simple and may be produced easily and inexpensively. In addition, by forming the shoes 8 to slightly overhang the driving head 2, the spring 22 is caused to engage the ends of the head 2. Thus, when the clutch is actuated to cause the shoes 8 to move outwardly and engage the drum 12, if the head 2 becomes canted with respect to the shoes 8, the corners 24 of the head will urge the spring 22 outwardly. Consequently, when the clutch is deactivated the spring 22 will return the shoes 8 to their original position quickly and accurately.

It will be apparent that numerous variations and modifications may be made without departing from the invention. Accordingly, it should be clearly understood that the form of the invention described above and shown in the figures of the accompanying drawing are illustrative only and are not intended to limit the scope of the invention.

What is claimed is:

A novel clutch assembly comprising a generally cylindrical drum, a generally rectangular driving head having arcuate projections formed centrally of the longest sides thereof, a pair of clutch shoes mounted on opposite sides of said head, each of said shoes being formed in the shape of arcuate sections having a straight side engageable with the longest sides of said head and projecting slightly beyond both ends of said head and an arcuate side conforming to the inner surface of said drum and provided with a centrally located recess extending the entire length thereof, an arcuate recess formed in said straight side of each of said shoes engageable by said arcuate projections on said head to maintain said shoes centered with respect to said head, and a single, continuous coil spring seated in said centrally located recess and serving to normally maintain said shoes in engagement with said head.

References Cited in the file of this patent

UNITED STATES PATENTS

| | | |
|---|---|---|
| 1,926,483 | Hatcher | Sept. 12, 1933 |
| 2,564,826 | Yoder | Aug. 21, 1951 |
| 2,718,294 | Armstrong | Sept. 20, 1955 |
| 2,753,967 | Bowers | July 10, 1956 |
| 2,852,117 | Sproul | Sept. 16, 1958 |
| 2,942,711 | Zindler | June 28, 1960 |
| 2,947,399 | Moore et al. | Aug. 2, 1960 |